US012687708B2

(12) United States Patent
Yoshiki et al.

(10) Patent No.: US 12,687,708 B2
(45) Date of Patent: Jul. 21, 2026

(54) INFRARED OPTICAL SYSTEM

(71) Applicant: Mitsubishi Electric Corporation, Tokyo (JP)

(72) Inventors: Wataru Yoshiki, Tokyo (JP); Satoi Kobayashi, Tokyo (JP); Takayuki Nakano, Tokyo (JP); Takayuki Yanagisawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 318 days.

(21) Appl. No.: 18/378,377

(22) Filed: Oct. 10, 2023

(65) Prior Publication Data

US 2024/0053590 A1 Feb. 15, 2024

Related U.S. Application Data

(63) Continuation of application No. PCT/JP2021/022012, filed on Jun. 10, 2021.

(51) Int. Cl.
*G02B 13/14* (2006.01)
*G02B 7/02* (2021.01)
*G02B 13/18* (2006.01)

(52) U.S. Cl.
CPC ........... *G02B 13/146* (2013.01); *G02B 7/021* (2013.01); *G02B 13/18* (2013.01)

(58) Field of Classification Search
CPC ...... G02B 13/146; G02B 7/021; G02B 13/18; G02B 7/028; G02B 13/14; G02B 7/02;
(Continued)

(56) References Cited

U.S. PATENT DOCUMENTS 5,808,799 A * 9/1998 Klocek .............. G02B 27/4283
359/619
6,535,332 B1 3/2003 Nakano et al.
(Continued)

FOREIGN PATENT DOCUMENTS

CN 103033909 A 4/2013
CN 203825282 U * 9/2014
(Continued)

OTHER PUBLICATIONS

"Refractive index of silicon and germanium and its wavelength and temperature derivatives" Journal of Physical and Chemical https://doi.org/10.1063/1.555624 (Oct. 15, 2009). (Year: 2009).*
(Continued)

*Primary Examiner* — Thomas K Pham
*Assistant Examiner* — Kuei-Jen L Edenfield
(74) *Attorney, Agent, or Firm* — Birch, Stewart, Kolasch & Birch, LLP

(57) ABSTRACT

An infrared optical system includes: a spherical lens unit having an image-forming function as a whole and including one or more spherical lenses that form an image of an incident light beam from a subject; an aperture diaphragm unit that limits transmission of the incident light beam through the spherical lens unit; an aberration correcting plate unit that is disposed at a preceding stage of the spherical lens unit, has at least one aspherical surface, and gives an optical path length difference for compensating an aberration to be generated in the spherical lens unit to the incident light beam; and a lens barrel unit holding the spherical lens unit, the aperture diaphragm unit, and the aberration correcting plate unit.

20 Claims, 12 Drawing Sheets

(58) Field of Classification Search
CPC .... G02B 13/008; G02B 19/009; G02B 5/208; G02B 5/28; C03C 4/10; C03C 4/082; G03B 30/00
USPC ................................. 359/350–361, 580–590
See application file for complete search history.

(56) References Cited

U.S. PATENT DOCUMENTS

| | | | |
|---|---|---|---|
| 9,874,729 B2 | 1/2018 | Schuster | |
| 2012/0176668 A1 | 7/2012 | Saito et al. | |
| 2013/0083200 A1* | 4/2013 | Saito | G02B 13/18 |
| | | | 359/356 |
| 2020/0257129 A1 | 8/2020 | Saito | |

FOREIGN PATENT DOCUMENTS

| | | | |
|---|---|---|---|
| JP | 2001-188166 A | 7/2001 | |
| JP | 2001-290073 A | 10/2001 | |
| JP | 2002-511151 A | 4/2002 | |
| JP | 2011-102906 A | 5/2011 | |
| JP | 2012-141522 A | 7/2012 | |
| JP | 2016-139093 A | 8/2016 | |
| JP | 2018-84704 A | 5/2018 | |
| JP | 2020-134536 A | 8/2020 | |
| WO | WO 00/52511 A1 | 9/2000 | |
| WO | WO 2009/109979 A2 | 9/2009 | |
| WO | WO 2009/109979 A3 | 9/2009 | |
| WO | WO 2015/029645 A1 | 3/2015 | |
| WO | WO 2016/072294 A1 | 5/2016 | |

OTHER PUBLICATIONS

Refractive indices and extinction coefficients of polymers for the mid-infrared region: Oct. 20, 1998/vol. 37, No. 30/Applied Optics (Year: 1998).*
English translation of CN203825282 (Year: 2014).*
Extended European Search Report for European Application No. 21945119.2, dated May 24, 2024.
International Search Report, issued in PCT/JP2021/022012, PCT/ISA/210, dated Jun. 10, 2021.
Notice of Reasons for Refusal for Japanese Application No. 2021-557257, dated Dec. 7, 2021.
Communication pursuant to Article 94(3) EPC issued in European Application No. 21 945 119.2 on Jan. 10, 2025.
Chinese Office Action and Search Report for Chinese Application No. 202180098814.1, dated Mar. 27, 2026, with English translation of the Office Action.

* cited by examiner

Figure 8:
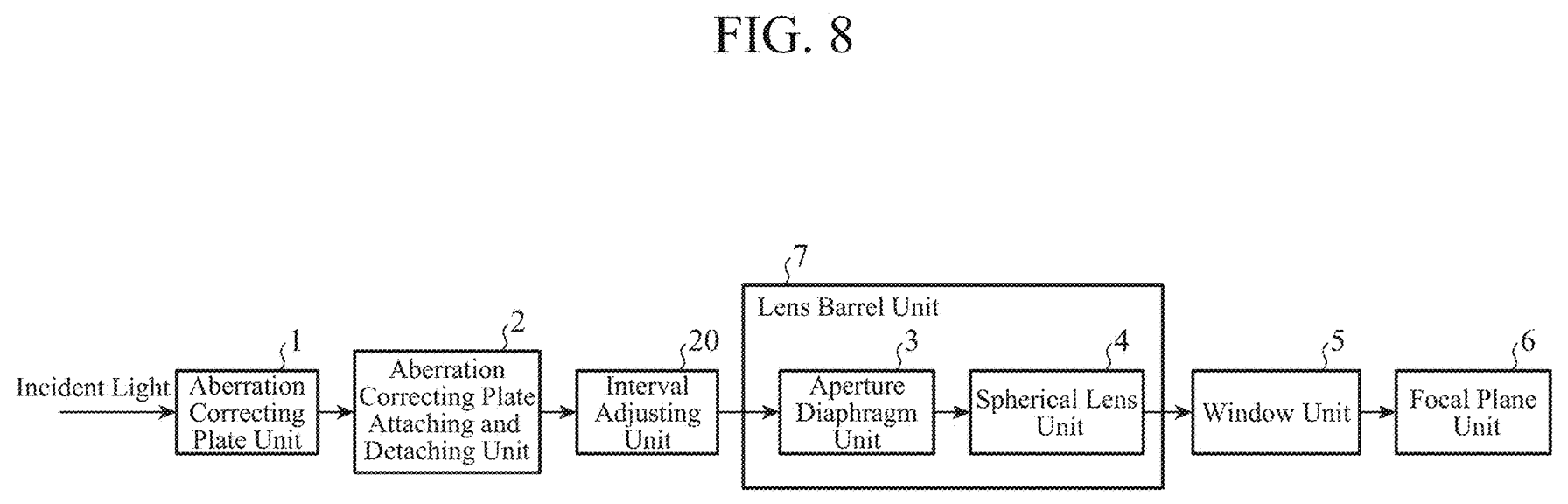

Incident Light

Aberration Correcting Plate Unit — 1

Aberration Correcting Plate Attaching and Detaching Unit — 2

Interval Adjusting Unit — 20

Lens Barrel Unit — 7

Aperture Diaphragm Unit — 3

Spherical Lens Unit — 4

Window Unit — 5

Focal Plane Unit — 6

INFRARED OPTICAL SYSTEM

CROSS REFERENCE TO RELATED APPLICATIONS

This application is a Continuation of PCT International Application No. PCT/JP2021/022012 filed on Jun. 10, 2021, which is hereby expressly incorporated by reference into the present application.

TECHNICAL FIELD

The present disclosure relates to an infrared optical system.

BACKGROUND ART

Patent Literature 1 discloses, as a lens used in an infrared wavelength band (8 to 12 µm), a lens obtained by thinly applying a resin to a spherical lens made of a material such as germanium (Ge), silicon (Si), or zinc selenium (ZnSe) and molding the applied resin into an aspherical shape. The material such as Ge, Si, or ZnSe has a high transmittance in the infrared wavelength band, but it is difficult to process a lens made of any of these materials into an aspherical surface. Therefore, Patent Literature 1 adopts a technique of constituting an infrared optical system by thinly applying a resin to a spherical lens made of a material such as Ge, Si, or ZnSe and molding the resin surface into an aspherical surface. Note that a reason why the shape of the resin surface is made aspherical is to correct an aberration.

CITATION LIST

Patent Literature

Patent Literature 1: JP 2016-139093 A

SUMMARY OF INVENTION

Technical Problem

By the way, there is a need for an infrared optical system capable of adjusting a resolution depending on an application or a situation. For example, a home electronic device including an infrared camera grasps an approximate position of a person by capturing the thermal radiation from the person with the infrared camera, and controls an operation depending on the position. In an infrared camera used for such an application, it is required to set a resolution of an optical system to be low in such a manner that detailed information on a face and a body shape of a person is unclear from a viewpoint of privacy protection. Meanwhile, in a case where a temperature of a person or an object is measured with high accuracy using an infrared optical system as, for example, a security camera or a fire detection camera, a high resolution is required for the infrared optical system. As described above, there is a need for an infrared optical system capable of adjusting a resolution depending on an application.

According to the infrared optical system of Patent Literature 1 mentioned above, since the resin portion is applied to the spherical lens and integrated with the spherical lens, there is a problem that a resolution cannot be adjusted once the infrared optical system is constructed.

The present disclosure has been made in order to solve such a problem, and an object of the present disclosure is to provide an infrared optical system capable of adjusting a resolution depending on an application or a situation.

Solution to Problem

An infrared optical system according to an embodiment of the present disclosure includes: a spherical lens group having an image-forming function as a whole and including one or more spherical lenses that form an image of an incident light beam from a subject; an aperture diaphragm that limits transmission of the incident light beam through the spherical lens group; an aberration correcting plate that is disposed at a preceding stage of the spherical lens group, has at least one aspherical surface, and gives an optical path length difference for compensating an aberration to be generated in the spherical lens group to the incident light beam; an aberration correcting plate attaching and detaching part to and from which the aberration correcting plate is attachable and detachable; and a lens barrel holding the spherical lens group, the aperture diaphragm, the aberration correcting plate, and the aberration correcting plate attaching and detaching part, wherein the spherical lens group has a structure maintaining image-forming capability regardless of attachment and detachment of the aberration correcting plate, and in a case where power of the spherical lens group is denoted by $\varphi$, an F value of the spherical lens group is denoted by F, and a maximum allowable diameter of a spot diameter generated by the spherical lens group on an image surface is denoted by $\varepsilon$, a parameter $\beta = \varphi'(1 - \varphi'L')^{-1}$ expressed by power of the aberration correcting plate and an interval L' between the aberration correcting plate and the spherical lens satisfies a relationship of $|\beta[\varphi(\beta+\varphi)]^{-1}| < \varepsilon F$.

Advantageous Effects of Invention

An infrared optical system according to embodiments of the present disclosure can adjust a resolution depending on an application or a situation.

BRIEF DESCRIPTION OF DRAWINGS

FIG. 4 is an explanatory diagram of limitation of a parameter $\beta$ in the infrared optical system according to the third embodiment.

FIG. 8 is a block diagram illustrating an infrared optical system according to a fifth embodiment.

DESCRIPTION OF EMBODIMENTS

Figure 1:
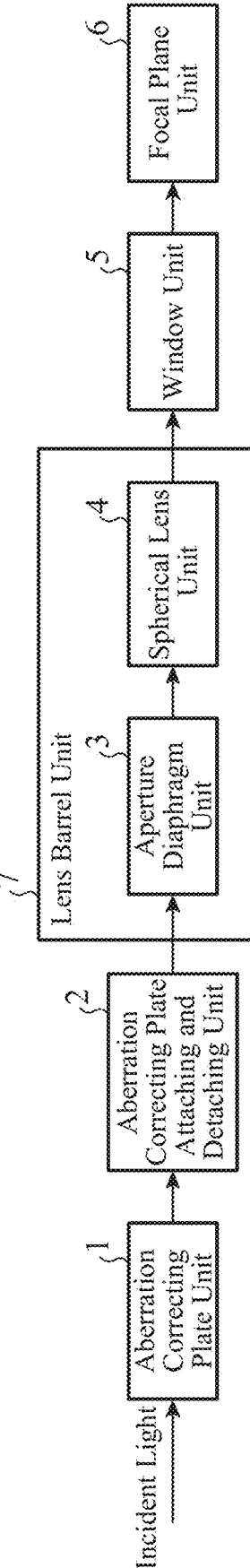
FIG. 1 is a block diagram illustrating an infrared optical system according to first to third embodiments.

Hereinafter, various embodiments in the present disclosure will be described in detail with reference to FIGS. 1 to 13. Note that constituent elements denoted by the same or similar reference numerals throughout the drawings have the same or similar configurations or functions, and redundant description of such constituent elements is omitted.

First Embodiment

Configuration

Figure 2:
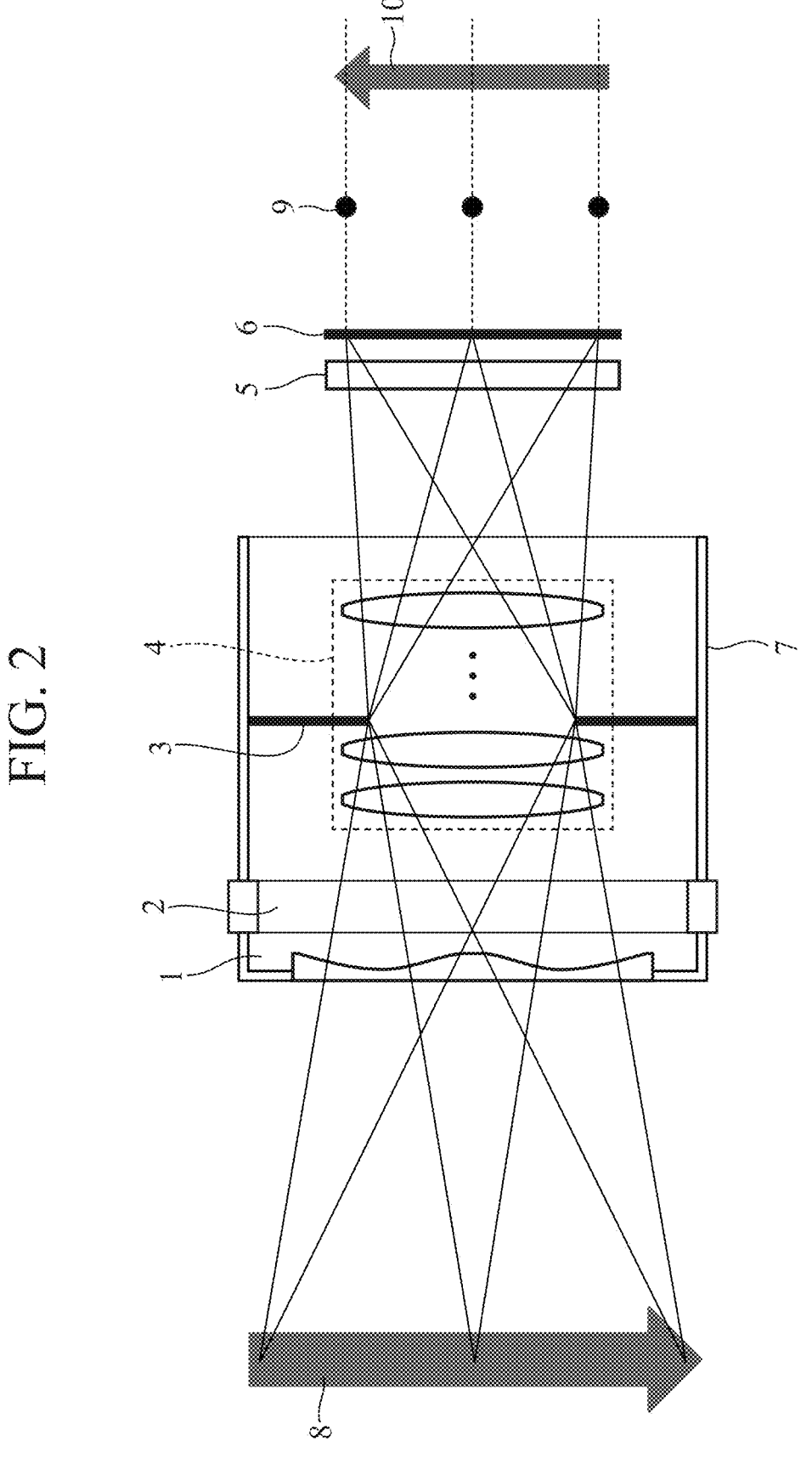
FIG. 2 is an operation explanatory diagram in the infrared optical system according to the first embodiment.

An infrared optical system according to a first embodiment of the present disclosure will be described with reference to FIGS. 1 to 3. As illustrated in FIGS. 1 and 2, the infrared optical system according to the first embodiment includes an aberration correcting plate unit 1, an aberration correcting plate attaching and detaching unit 2, an aperture diaphragm unit 3, a spherical lens unit 4, a window unit 5, a focal plane unit 6, and a lens barrel unit 7. In a case where the focal plane unit 6 does not particularly require protection, the infrared optical system does not have to include the window unit 5.

(Spherical Lens Unit)

The spherical lens unit 4 converts a light beam in an infrared wavelength band (8 to 12 µm) emitted from each point of an object 8 into a focused spot 9 on the focal plane unit 6. As a result, an object image 10 is formed on the focal plane unit 6. The spherical lens unit 4 is disposed inside the lens barrel unit 7. Configuration examples of the spherical lens unit 4 include one or more spherical lenses using silicon (Si) that exhibits a high transmittance in the infrared wavelength band and has low material cost, and the one or more spherical lenses have an image-forming function as a whole.

A refractive index of a material used for the spherical lens unit 4 at a wavelength of 10 µm may be equal to or more than 2.0 and equal to or less than 4.1, and a total center thickness of the lenses included in the spherical lens unit 4 may be equal to or less than 10 mm.

Examples of a material exhibiting a high transmittance in the infrared wavelength band include Ge, Si, ZnSe, ZnS, NaCl, and KBr. The refractive indexes of these respective materials are approximately 4.0, 3.4, 2.4, 2.6, 1.5, and 1.5. The higher the refractive index, the higher the aberration correction capability of a lens. However, on the other hand, the higher the refractive index, the higher the material cost tends to be. Therefore, as the refractive index at a wavelength of 10 µm, a range of equal to or more than 2.0 and equal to or less than 4.1 is useful.

In addition, although these materials each exhibit a high transmittance in the infrared wavelength band, there is a problem that the transmittance is lower than that of a material (for example, BK-7) in a visible wavelength band. A range in which the total of the center thicknesses of the lenses included in the spherical lens unit 4 is 10 mm or less is useful from a viewpoint of ensuring a sufficient amount of light.

(Aperture Diaphragm Unit)

The aperture diaphragm unit 3 is disposed between the aberration correcting plate unit 1 and the spherical lens unit 4 or on the spherical lens unit 4, and has a function of adjusting brightness of the object image 10 formed on the focal plane unit 6 by limiting a light flux diameter incident on the spherical lens unit 4 or emitted from the spherical lens unit 4. The expression "on the spherical lens unit 4" is an internal space of the lens barrel unit 7, and is a region defined by a plane orthogonal to an optical axis at a foremost position of a front surface of a foremost lens included in the spherical lens unit 4 and a plane orthogonal to the optical axis at a rearmost position of a rear surface of a rearmost lens included in the spherical lens unit 4. In a case where the spherical lens unit 4 is made of a single spherical lens, the foremost lens and the rearmost lens are the same lens. Note that the term "front" means an object side, and the term "rear" means an image side. By disposing the aperture diaphragm unit 3 between the aberration correcting plate unit 1 and the spherical lens unit 4 or on the spherical lens unit 4, even in a case where the aberration correcting plate unit 1 is detached, a light flux incident on the spherical lens unit 4 can be adjusted.

(Aberration Correcting Plate Unit)

The aberration correcting plate unit 1 is connected to the lens barrel unit 7 by the aberration correcting plate attaching and detaching unit 2, and is located at a preceding stage of the spherical lens unit 4. The entire shape of the aberration correcting plate unit 1 is a bottomed cylindrical shape like a lens cap. The aberration correcting plate unit 1 has a function of compensating an aberration to be generated in the spherical lens unit 4 in advance. That is, the aberration correcting plate unit 1 compensates an aberration to be generated in the spherical lens unit 4 in advance by giving, to a light beam incident on the spherical lens unit 4, a phase difference corresponding to a position and an incident angle when the incident light beam passes through the aberration correcting plate unit 1. In order to achieve such a function, at least one surface of the aberration correcting plate unit 1 is formed in an aspherical shape. Configuration examples of the aberration correcting plate unit 1 include a resin material having a characteristic of transmitting light in the infrared wavelength band, having low material cost, and easily introducing an aspherical surface by molding. Since the aberration correcting plate unit 1 is located at a preceding stage of the spherical lens unit 4, that is, located at a preceding stage of the spherical lens unit 4 so as to be separated from the spherical lens unit 4, the aberration correcting plate unit 1 can be detached from the lens barrel unit 7 including the spherical lens unit 4.

A refractive index of a material of the aberration correcting plate unit 1 may be equal to or more than 1.0 and equal to or less than 2.0 at a wavelength of 10 µm, and a center thickness of the aberration correcting plate unit 1 may be equal to or less than 2 mm. A refractive index of a resin material having transmissivity in the infrared wavelength band is approximately equal to or more than 1.0 and equal to or less than 2.0. Furthermore, since the resin material has a lower transmittance in the infrared wavelength band than a crystal material such as Si or Ge, as the center thickness of the aberration correcting plate unit 1, a range of 2 mm or less is useful from a viewpoint of ensuring the amount of light.

(Aberration Correcting Plate Attaching and Detaching Unit)

The aberration correcting plate attaching and detaching unit 2 is located between the aberration correcting plate unit 1 and the lens barrel unit 7, and has a function of connecting the aberration correcting plate unit 1 and the lens barrel unit 7 in an easily attachable and detachable manner. The entire shape of the aberration correcting plate attaching and detaching unit 2 is adapted to the shape of an edge of the lens barrel unit 7. For example, when the lens barrel unit 7 has a cylindrical shape, the aberration correcting plate attaching and detaching unit 2 has an annular shape. Alternatively, when the lens barrel unit 7 has a hollow quadrangular prism shape, the aberration correcting plate attaching and detaching unit 2 has a quadrangular shape.

In order to achieve such a function, as an example, the aberration correcting plate attaching and detaching unit 2 has a structure to be fitted to both or one of the aberration correcting plate unit 1 and the lens barrel unit 7. As another example, the aberration correcting plate attaching and detaching unit 2 has a structure screwed with both or one of the aberration correcting plate unit 1 and the lens barrel unit 7. In this case, the aberration correcting plate unit 1 or the lens barrel unit 7 is formed in a corresponding female or male shape depending on a male or female shape of the aberration correcting plate attaching and detaching unit 2. The aberration correcting plate attaching and detaching unit 2 is made of, for example, a resin or stainless steel.

The aberration correcting plate attaching and detaching unit 2 may be detachable from both the aberration correcting plate unit 1 and the lens barrel unit 7. In addition, the aberration correcting plate attaching and detaching unit 2 may be integrated with one of the aberration correcting plate unit 1 and the lens barrel unit 7 and does not have to be easily detached from the aberration correcting plate unit 1 or the lens barrel unit 7.

(Window Unit)

The window unit 5 is disposed at a preceding stage of the focal plane unit 6 and has a function of protecting the focal plane unit 6. In a case where the focal plane unit 6 requires vacuum airtightness, the window unit 5 may have a vacuum airtightness function. In addition, in a case where the focal plane unit 6 requires cooling, the window unit 5 may have a function as a Dewar window. Furthermore, in a case where the focal plane unit 6 does not particularly require protection, the window unit 5 does not have to be included.

(Focal Plane Unit)

The focal plane unit 6 includes an infrared sensor and is disposed at a subsequent stage of the window unit 5. The focal plane unit 6 has a function of electrically reading the object image 10 formed on the focal plane unit 6 by the spherical lens unit 4.

(Lens Barrel Unit)

The lens barrel unit 7 is disposed at a subsequent stage of the aberration correcting plate attaching and detaching unit 2, and holds the spherical lens unit 4 and the aperture diaphragm unit 3 inside the lens barrel unit 7. The lens barrel unit 7 has a cylindrical or polygonal tubular shape having a hollow internal space so as to be able to hold the spherical lens unit 4 and the aperture diaphragm unit 3. The lens barrel unit 7 is made of, for example, a material such as aluminum, stainless steel, or polycarbonate. The lens barrel unit 7 may include the window unit 5 and the focal plane unit 6 therein.

Operation

An operation of the infrared optical system according to the present embodiment will be described with reference to FIGS. 2 and 3. A difference between the configuration illustrated in FIG. 2 and the configuration illustrated in FIG. 3 is presence or absence of the aberration correcting plate unit 1. First, an operation of the configuration of FIG. 3 in which the aberration correcting plate unit 1 is detached will be described, and then an operation of the configuration of FIG. 2 in which the aberration correcting plate unit 1 is attached will be described.

Figure 3:
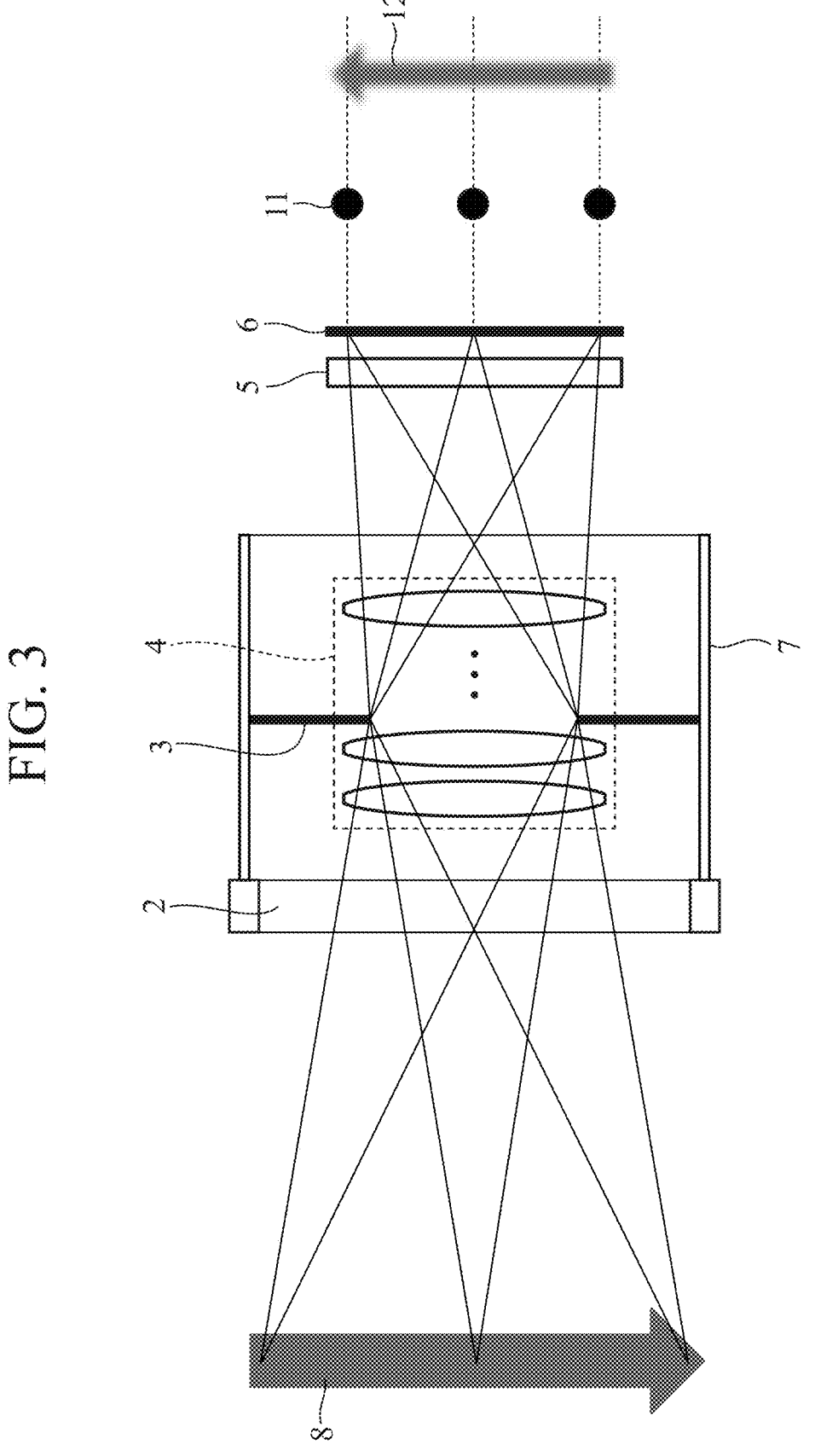
FIG. 3 is an operation explanatory diagram in a case where an aberration correcting plate unit is detached in the infrared optical system according to the first embodiment.

In FIG. 3, some of light beams in the infrared wavelength band emitted from points of the object 8 are incident on the spherical lens unit 4. The incident light flux is refracted by the spherical lens unit 4, becomes a convergent light flux toward the focal plane unit 6, and is emitted from the spherical lens unit 4. The diameter of the light flux incident on the spherical lens unit 4 or the light flux emitted from the spherical lens unit 4 is limited by the aperture diaphragm unit 3. By the function of the aperture diaphragm unit 3, the amount of light incident on the focal plane unit 6 is adjusted, a light beam passing through a position away from an optical axis of the spherical lens unit 4 is removed, and an aberration generated by the spherical lens unit 4 is suppressed. The light flux emitted from the spherical lens unit 4 passes through the window unit 5, then reaches the focal plane unit 6, and forms a plurality of focused spots 11. The above operation is simultaneously performed for the points on the object 8 in parallel, whereby an object image 12 is formed on the focal plane unit 6.

In a case where a configuration capable of the above operation is achieved at low cost, it is conceivable to manufacture the spherical lens unit 4 using Si or the like which exhibits a high transmittance in the infrared wavelength band and has low material cost. In addition, in order to achieve the spherical lens unit 4 at low cost, the number of lenses is desirably smaller, and ideally, the spherical lens unit 4 desirably includes one lens. Meanwhile, since there is a limit to an aberration amount that can be corrected with a small number of spherical lenses, each focused spot 11 on the focal plane unit 6 is enlarged as illustrated in FIG. 3, and as a result, an image in which a blur is superimposed, such as the object image 12, is formed. An image having a low resolution, such as the object image 12, is useful, for example, for an application of grasping a position of a heat source such as a person or an animal with certain accuracy. In such an application, information on a face, a body shape, and the like of a person is desirably unclear from a viewpoint of privacy protection, and an image having a low resolution is suitable.

Meanwhile, in the configuration of FIG. 2, the aberration correcting plate unit 1 is attached, and a light beam in the infrared wavelength band emitted from the object 8 passes through the aberration correcting plate unit 1 before being incident on the spherical lens unit 4. The aberration correcting plate unit 1 has a function of compensating an aberration to be generated in the spherical lens unit 4 in advance, and a light flux condensed by the spherical lens unit 4 after passing through the aberration correcting plate unit 1 generates a spot such as the focused spot 9 on the focal plane unit 6. Since the size of the focused spot 9 is smaller than that of the focused spot 11 described above, the object image 10 formed by the focused spot 9 is clearer than the object image 12.

In the first embodiment, since the aberration correcting plate unit 1 is disposed at a preceding stage of the spherical lens unit 4, that is, located at a preceding stage of the spherical lens unit 4 so as to be separated from the spherical lens unit 4, the aberration correcting plate unit 1 can be detached from the lens barrel unit 7 including the spherical lens unit 4. Therefore, the aberration correcting plate unit 1 can be attached and detached depending on an application.

In addition, since the infrared optical system includes a member capable of easily attaching and detaching the aberration correcting plate unit 1 to and from the lens barrel unit 7, such as the aberration correcting plate attaching and detaching unit 2, the operations of FIGS. 2 and 3 can be switched from each other at any timing.

An increase in resolution that can be achieved by the configuration of FIG. 2 is useful, for example, at the time of temperature measurement. When the infrared optical system has a low resolution, it is difficult to measure an accurate temperature due to an influence of leakage of an optical signal between pixels of an infrared sensor. This leakage can be suppressed by the increase in resolution, and the accuracy of temperature measurement can be improved.

As a method for improving a resolution, there are a method for increasing the number of lenses used in the spherical lens unit 4 and a method for introducing an aspherical surface into the spherical lens unit 4, both of which lead to an increase in cost. As described in Patent Literature 1, a technique of introducing an aspherical surface at low cost by applying a resin to a spherical lens is also known, but in this case, a function of adjusting a resolution at any timing cannot be achieved.

Effects

As in the present disclosure, by inclusion of the aberration correcting plate unit 1 in the infrared optical system, a resolution and a throughput of the infrared optical system can be improved while cost is suppressed. In addition, by attaching and detaching the aberration correcting plate unit 1, the resolution of the infrared optical system can be changed at any timing depending on an application.

Second Embodiment

Hereinafter, an infrared optical system according to a second embodiment will be described.

Configuration

According to the technique of Patent Literature 1, a resin and a lens to which the resin is applied can be attached and detached together, but since the lens to be attached and detached has power, there is a problem that in a case where the lens is detached together with the resin normal image formation cannot be performed only with the remaining optical system. Furthermore, according to the technique of Patent Literature 1, positional displacement may occur at a position where the lens to be attached and detached is disposed every time the lens is attached or detached, but since the lens to be attached and detached has power, there is a problem that an image-forming characteristic may be largely deteriorated depending on the positional displacement. The infrared optical system of the second embodiment is an infrared optical system for solving these problems. The entire configuration of the infrared optical system of the second embodiment is similar to the configuration of the infrared optical system of the first embodiment illustrated in FIG. 1. In the infrared optical system of the second embodiment, a structure of a spherical lens unit 4 is optimized so as to be able to exhibit a constant resolution in a wide view angle range, and a structure of an aberration correcting plate unit 1 is optimized in such a manner that a resolution around an optical axis is particularly improved in a case where the aberration correcting plate unit 1 is attached to a lens barrel unit 7. That is, the spherical lens unit 4 has a structure maintaining image-forming capability regardless of attachment and detachment of the aberration correcting plate unit, and the aberration correcting plate unit 1 has a thickness corresponding to a light beam height so as to compensate a spherical aberration to be generated in the spherical lens unit 4.

Operation

In the infrared optical system according to the second embodiment, an operation related to the aberration correcting plate unit 1 is different from that of the first embodiment. Hereinafter, the operation related to the difference will be described.

The aberration correcting plate unit 1 has a function of compensating an aberration around an optical axis generated in the spherical lens unit 4 in advance when a light beam in the infrared wavelength band emitted from an object 8 passes through the aberration correcting plate unit 1. As a result, the focused spot 9 in FIG. 2 is smaller in a region around the optical axis than the focused spot 11 in FIG. 3 illustrating a configuration in which the aberration correcting plate unit 1 is not attached. Meanwhile, the size of the focused spot 9 is not changed or enlarged in a region other than the region around the optical axis. As a result, a resolution of an object image generated on a focal plane unit 6 in the present embodiment is improved as compared with an object image 12 in the region around the optical axis, and does not change or deteriorates in the other regions.

In the spherical lens unit 4, various aberrations such as a spherical aberration, an astigmatism, and a field curvature are generated. In particular, in the infrared optical system, a large aperture diameter (low F value) is required for the spherical lens unit 4 in order to increase the amount of light incident on the focal plane unit 6. In such a spherical lens with a large aperture, the aberration is significantly exhibited.

Among the aberrations, the spherical aberration can be significantly improved by constituting the aberration correcting plate unit 1 so as to give an optical path length difference that compensates the spherical aberration to be generated in the spherical lens unit 4. Since the spherical aberration particularly deteriorates a resolution around the optical axis, the resolution around the optical axis can be improved by compensation for the spherical aberration. Meanwhile, in a case where the aberration correcting plate unit 1 is constituted as described above, a resolution may be deteriorated in a region away from the region around the optical axis where an influence of an aberration other than the spherical aberration is large as compared with that before the aberration correcting plate unit 1 is attached. Therefore, it can be said that the present embodiment significantly improves a resolution around the optical axis by sacrificing a resolution of a region other than the region around the optical axis.

By improving the resolution around the optical axis, it is useful in a case where it is desired to measure a temperature of a specific region (for example, a forehead of a person's face) of an object image 10 with high accuracy. In such a case, while a high resolution is required for a specific region, a request for a resolution other than the specific region is low.

Meanwhile, in a case where the aberration correcting plate unit 1 is detached, since the spherical lens unit 4 has optimized optical characteristics in the entire view angle range, an image having a moderate resolution can be acquired in a wide view angle range. As a result, a direction of a person or a heat source can be detected in a wide view angle range. Therefore, a use method can be switched depending on presence or absence of the aberration correcting plate unit 1.

Effects

By narrowing the aberration to be corrected by the aberration correcting plate unit 1 to the spherical aberration, the resolution around the optical axis can be significantly improved. In addition, not only the resolution but also a region of interest can be changed by attaching and detaching the aberration correcting plate unit 1.

Third Embodiment

Hereinafter, an infrared optical system according to a third embodiment will be described.

Configuration

The entire configuration of the infrared optical system of the third embodiment is similar to the configuration of the infrared optical system of the first embodiment illustrated in FIG. 1. In the infrared optical system of the third embodiment, in a case where power of a spherical lens unit 4 is denoted by (p, an F value of the spherical lens unit 4 is denoted by F, and a maximum allowable diameter of a spot diameter generated by the spherical lens unit 4 on a focal plane unit 6 is denoted by $\varepsilon$, a parameter $\beta = \varphi'(1-\varphi'L')^{-1}$, which is expressed by using power $\varphi'$ of an aberration correcting plate unit 1 and an interval L' between the aberration correcting plate unit 1 and the spherical lens unit 4, satisfies a relationship of $|\beta[\varphi(\beta+\varphi)]^{-1}| < \varepsilon F$.

Operation

By the parameter $\beta = \varphi'(1-\varphi'L')^{-1}$ satisfying the relationship of $|\beta[\varphi(\beta+\varphi)]^{-1}| > \varepsilon F$, a spot diameter on the focal plane unit 6, the spot diameter changing with attachment of the aberration correcting plate unit 1, is equal to or less than the maximum allowable diameter $\varepsilon$ of the spot diameter. This prevents a decrease in resolution due to attachment of the aberration correcting plate unit 1. Furthermore, by setting a parameter having a margin in the relational expression, sensitivity to a tolerance related to the shape and the position of the aberration correcting plate unit 1 can be reduced.

Figure 4:
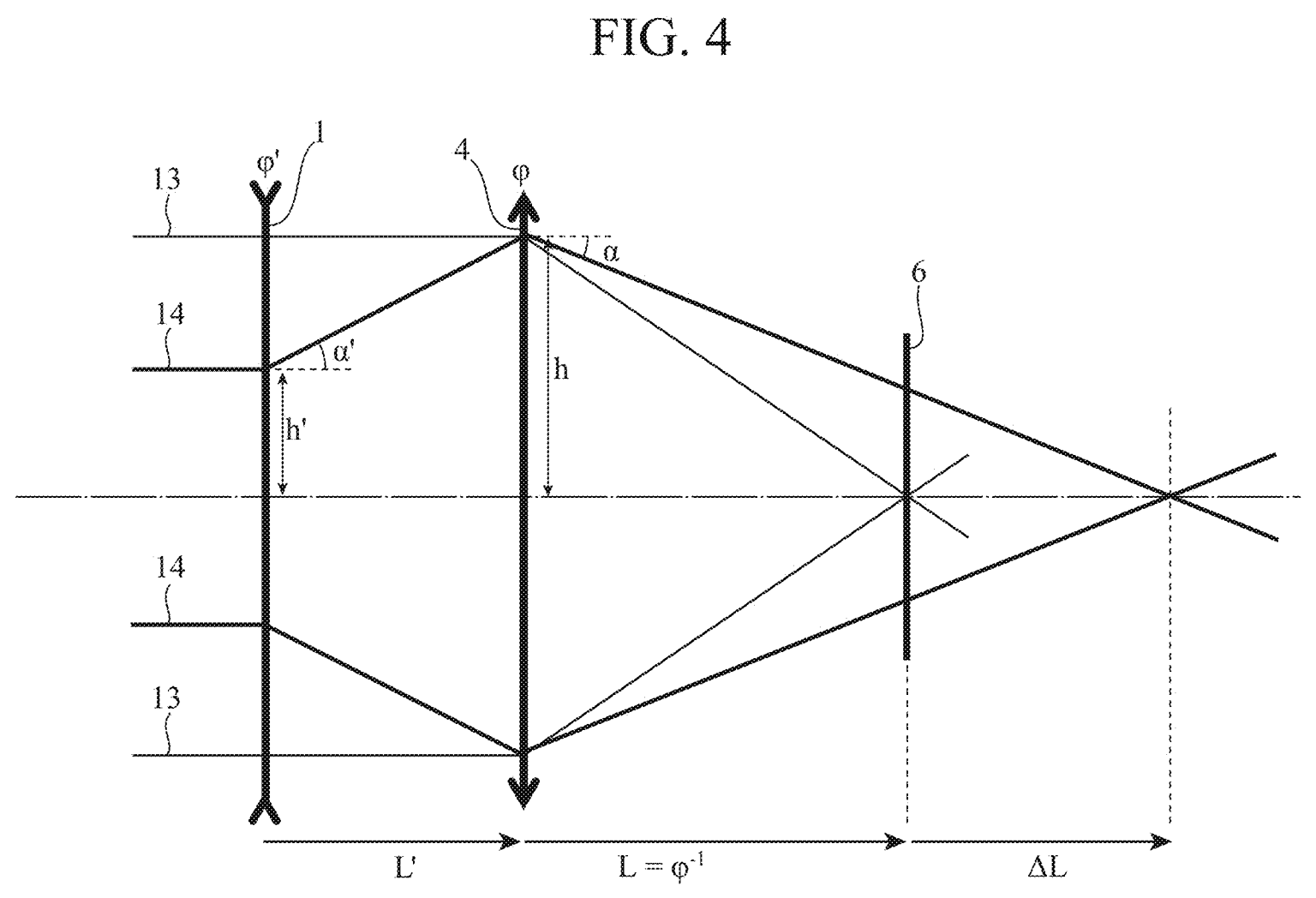

Such an operation will be described in detail with reference to FIG. 4. An optical path 13 is an optical path through which a light beam passing through an outermost side of the spherical lens unit 4 passes in a case where an image of an object at infinity is formed only by the spherical lens unit 4. Power of the spherical lens unit 4 is denoted by $\varphi$, a maximum height of a light beam passing through the spherical lens unit 4 is denoted by h, an angle formed by a light beam that has passed through the spherical lens unit 4 and the optical axis is denoted by $\alpha$, and an interval between the spherical lens unit 4 and the focal plane unit 6 is denoted by L. Here, L coincides with $\varphi^{-1}$. In this case, a light beam that has passed through the spherical lens unit 4 intersects with the optical axis at a point of a distance L from the spherical lens unit 4. Here, since the point of the distance L coincides with the focal plane unit 6, a spot diameter on the focal plane unit 6 is minimized.

An optical path 14 is an optical path through which a light beam passing through an outermost side of the spherical lens unit 4 passes in a case where an image of an object at infinity is formed by an optical system in which the aberration correcting plate unit 1 is disposed at a preceding stage of the spherical lens unit 4. A height at which the light beam passes through the aberration correcting plate unit 1 is denoted by h', an angle formed by the light beam with the optical axis after passing through the aberration correcting plate unit 1 is denoted by $\alpha'$, power of the aberration correcting plate unit 1 is denoted by $\varphi'$, and an interval between the aberration correcting plate unit 1 and the spherical lens unit 4 is denoted by L'. In this case, a light beam that has passed through the spherical lens unit 4 intersects with the optical axis at a point $L+\Delta L$ away from the spherical lens unit 4 due to an influence of the power $\varphi'$ of the aberration correcting plate unit 1. In this case, since this point does not coincide with the focal plane unit 6, a spot diameter on the focal plane unit 6 is enlarged.

$\Delta L$ should be set in such a manner that a spot diameter on the focal plane unit 6 is equal to or less than the maximum allowable diameter $\varepsilon$. This is satisfied in a case where the following expression (1) is satisfied.

$$\Delta L < \varepsilon L / (2h - \varepsilon) \tag{1}$$

Furthermore, assuming a relationship of $\varepsilon \ll h$, expression (1) is simplified as the following expression (2).

$$\Delta L < \varepsilon L / (2h) = \varepsilon F \tag{2}$$

in which $F = L/(2h)$ is an F value of the spherical lens unit 4.

Next, an expression of $\Delta L$ is obtained. Parameters in FIG. 4 have relationships of the following expressions (3) to (6) on the basis of paraxial light beam tracing.

$$\alpha' = h'\varphi' \tag{3}$$

$$h = h' - \alpha'L' \tag{4}$$

$$\alpha = \alpha' + h\varphi \tag{5}$$

$$0 = h - \alpha(L + \Delta L) \tag{6}$$

By arranging expressions (3) to (6), the expression of $\Delta L$ is obtained as in the following expression (7).

$$\Delta L = -\beta[\varphi(\beta + \varphi)]^{-1} \tag{7}$$

in which $\beta = \varphi'(1-\varphi'L')^{-1}$ is satisfied.

From expressions (2) and (7), in a case where the condition of the following expression (8) is satisfied, a spot diameter formed on the focal plane unit 6 when the aberration correcting plate unit 1 is attached is equal to or less than E.

$$|\Delta L| = \left|\beta[\varphi(\beta + \varphi))]^{-1}\right| < \varepsilon F \qquad (8)$$

Note that since $\beta = \varphi'(1 - \varphi'L')^{-1}$ is satisfied, expression (8) limits the power $\varphi'$ of the aberration correcting plate unit 1 and the interval L' in a case where the power $\varphi$ of the spherical lens unit 4, F of the spherical lens unit 4, and the maximum allowable diameter $\varepsilon$ of the spot diameter are determined.

Effects

In the present embodiment, since the aberration correcting plate unit 1 and the aberration correcting plate attaching and detaching unit 2 are constituted so as to satisfy the relational expression $|\beta[\varphi(\beta+\varphi)]^{-1}| < \varepsilon F$, a spot diameter on the focal plane unit 6 after attachment of the aberration correcting plate unit 1 can be equal to or less than E. This contributes to maintaining a resolution after attachment of the aberration correcting plate unit 1.

In addition, if the aberration correcting plate unit 1 and the aberration correcting plate attaching and detaching unit 2 are constituted with a margin with respect to the relational expression $|\beta[\varphi(\beta+\varphi)]^{-1}| < \varepsilon F$, enlargement of a spot diameter caused by a fluctuation of the power of the aberration correcting plate unit 1 and a fluctuation of the interval can be suppressed. The fluctuation of the power may be caused by a change in environment including pressure, temperature, and humidity. This is particularly significant in a case where the aberration correcting plate unit 1 is thin or in a case where the aberration correcting plate unit 1 is made of a material sensitive to a change in surrounding environment, such as a resin. The fluctuation of the interval may be caused by positional displacement that occurs every time the aberration correcting plate unit 1 is attached or detached in addition to the change in environment. In the present disclosure, since attachment and detachment of the aberration correcting plate unit 1 are assumed, it is useful to suppress the positional displacement that occurs every time the aberration correcting plate unit 1 is attached or detached.

In the configuration of the infrared optical system according to the third embodiment as described above, the maximum allowable diameter c of the spot diameter may coincide with a pixel size of a detection element of an array type detector disposed on the focal plane unit 6. When the spot diameter after attachment of the aberration correcting plate unit 1 is equal to or smaller than the pixel size, a decrease in resolution due to attachment of the aberration correcting plate unit 1 and occurrence of various tolerances can be suppressed.

In addition, in the configuration of the infrared optical system according to the third embodiment, the maximum allowable diameter c of the spot diameter may coincide with a diffraction limit spot diameter. Even in a case where the spot diameter after attachment of the aberration correcting plate unit 1 is larger than the pixel size, when the maximum allowable diameter c of the spot diameter is equal to or less than the diffraction limit spot diameter, a decrease in resolution due to attachment of the aberration correcting plate unit 1 and occurrence of various tolerances can be suppressed within a realistic range.

Fourth Embodiment

Figure 6:
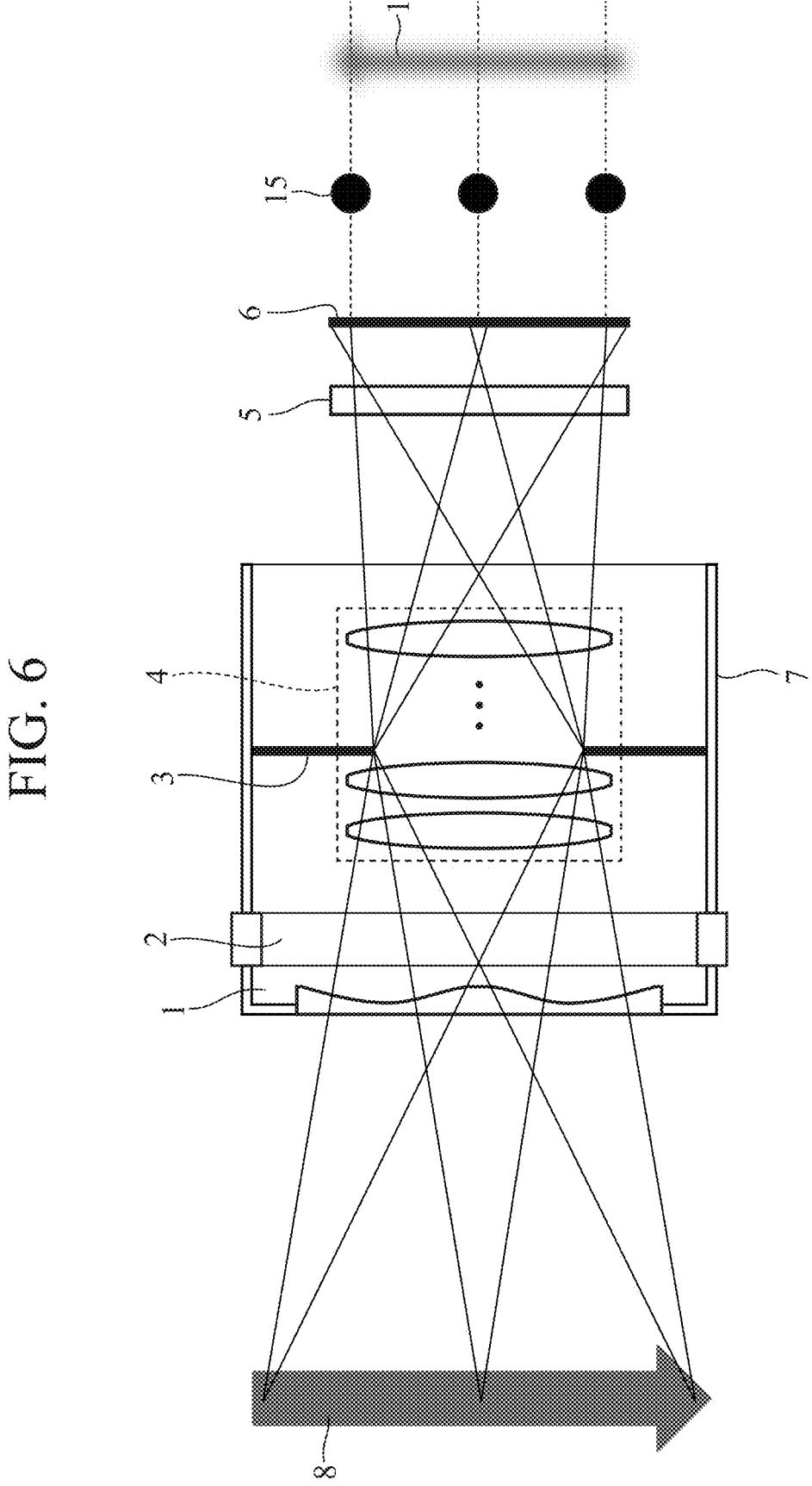
FIG. 6 is an operation explanatory diagram in a case where a temperature environment or a humidity environment largely changes in the infrared optical system according to the first embodiment.
Figure 7:
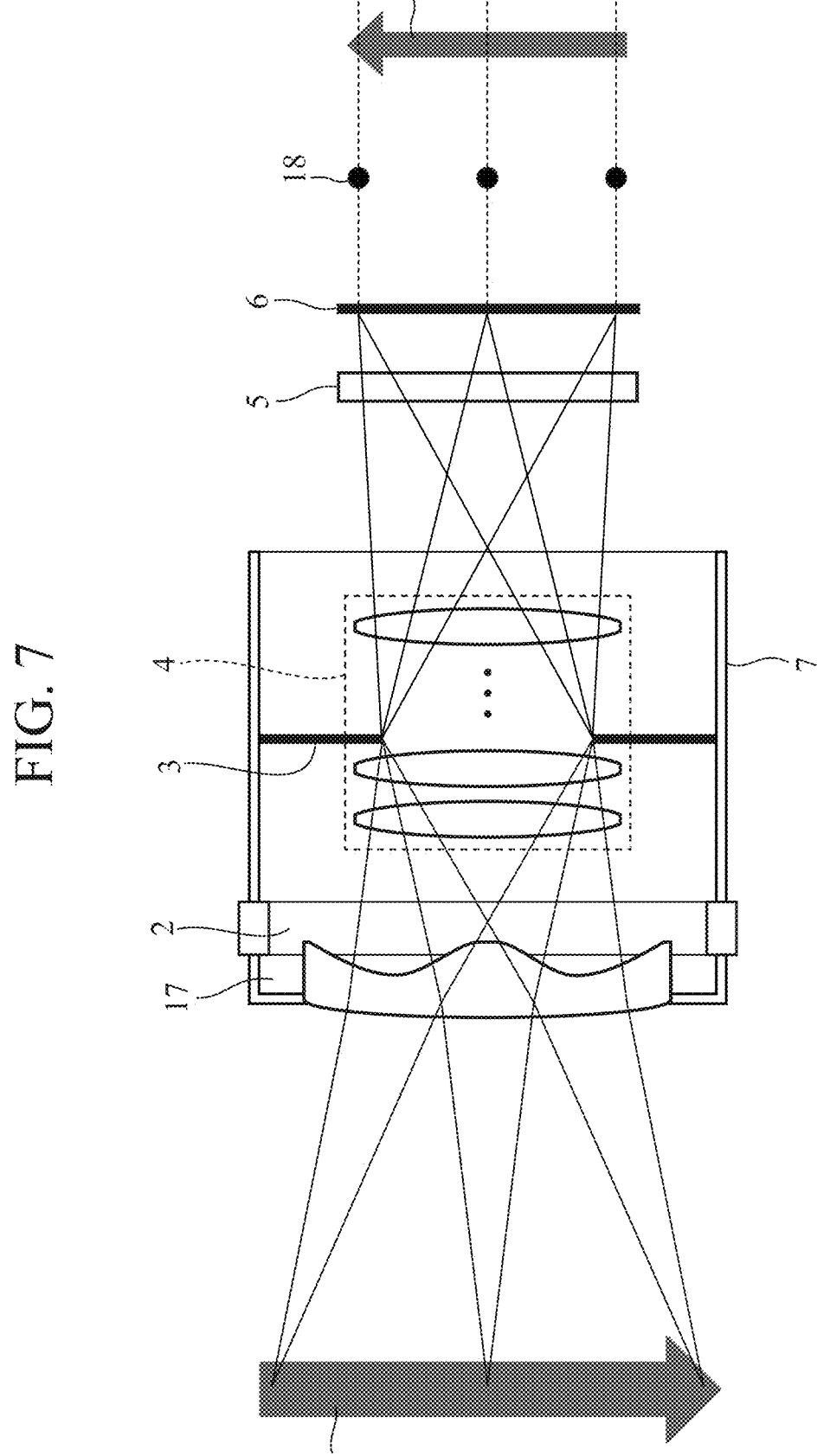
FIG. 7 is an operation explanatory diagram when an aberration correcting plate unit is replaced with an environment compensation aberration correcting plate unit in a case where a temperature environment or a humidity environment largely changes in the infrared optical system according to the fourth embodiment.

Hereinafter, an infrared optical system according to a fourth embodiment will be described with reference to FIGS. 5 to 7.

Configuration

Figure 5:
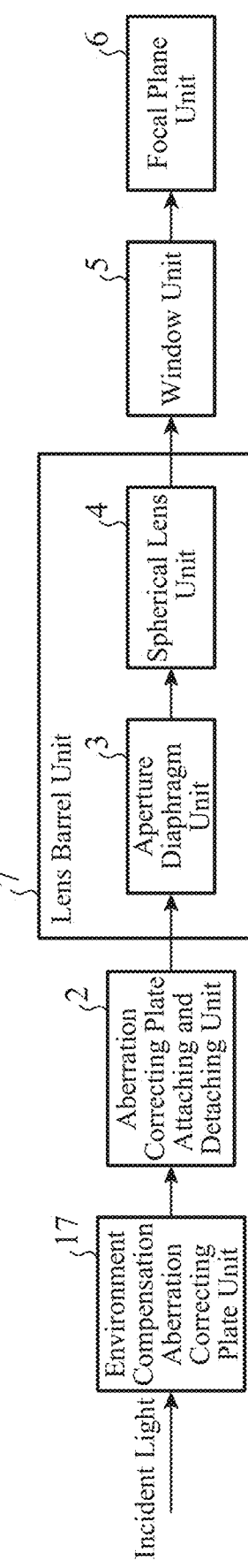
FIG. 5 is a block diagram illustrating an infrared optical system according to a fourth embodiment.

FIG. 5 illustrates a configuration diagram of the infrared optical system according to the fourth embodiment. The infrared optical system according to the fourth embodiment has a configuration in which the aberration correcting plate unit 1 in the infrared optical system according to the first embodiment is replaced with an environment compensation aberration correcting plate unit 17 having power. By including the environment compensation aberration correcting plate unit 17, the infrared optical system according to the fourth embodiment can correct defocus that is a change in image-forming performance due to a change in temperature environment or humidity environment.

Operation

An operation of the infrared optical system according to the fourth embodiment will be described with reference to FIGS. 6 and 7. FIG. 6 is an operation explanatory diagram in a case where a temperature environment or a humidity environment largely changes in the infrared optical system according to the first embodiment. As illustrated in FIG. 6, in a case where a large change occurs in a temperature environment or a humidity environment during an operation, the power of a spherical lens unit 4 or the length of a lens barrel unit 7 fluctuates, and displacement occurs between a focal position and a position of a focal plane unit 6. As a result, a focused spot 15 is enlarged, and a resolution of an object image 16 is decreased.

Meanwhile, in a case where large focal positional displacement as described above occurs, the positional displacement can be improved by replacing the aberration correcting plate unit 1 with the environment compensation aberration correcting plate unit 17. An operation in this case is illustrated in FIG. 7. FIG. 7 is an operation explanatory diagram in a case where an aberration correcting plate unit is replaced with an environment compensation aberration correcting plate unit when a temperature environment or a humidity environment largely changes in the infrared optical system according to the fourth embodiment. A focused spot 18 is reduced and a resolution of an object image 19 is restored by compensating the focal positional displacement by the environment compensation aberration correcting plate unit 17 and causing the focal position to coincide with the focal plane unit 6. In order to perform such an operation, the environment compensation aberration correcting plate unit 17 has some power.

By the above operation, even in a case where a temperature environment or a humidity environment changes, a certain resolution can be maintained. Such an operation is important in an application for outdoor use. For example, outdoors, a temperature environment or a humidity environment may largely fluctuate depending on a time period as well as a region and a season. By using the above operation, a resolution can be maintained in various environments by replacing only the aberration correcting plate unit 1 while the entire infrared optical system and a mechanism for fixing the entire infrared optical system are fixed.

Effects

In the present embodiment, by replacing the aberration correcting plate unit 1 with the environment compensation aberration correcting plate unit 17, defocus caused by a change in temperature environment or humidity environment can be corrected and a resolution can be restored while the entire infrared optical system and a mechanism for fixing the entire infrared optical system are fixed.

Fifth Embodiment

Figure 9:
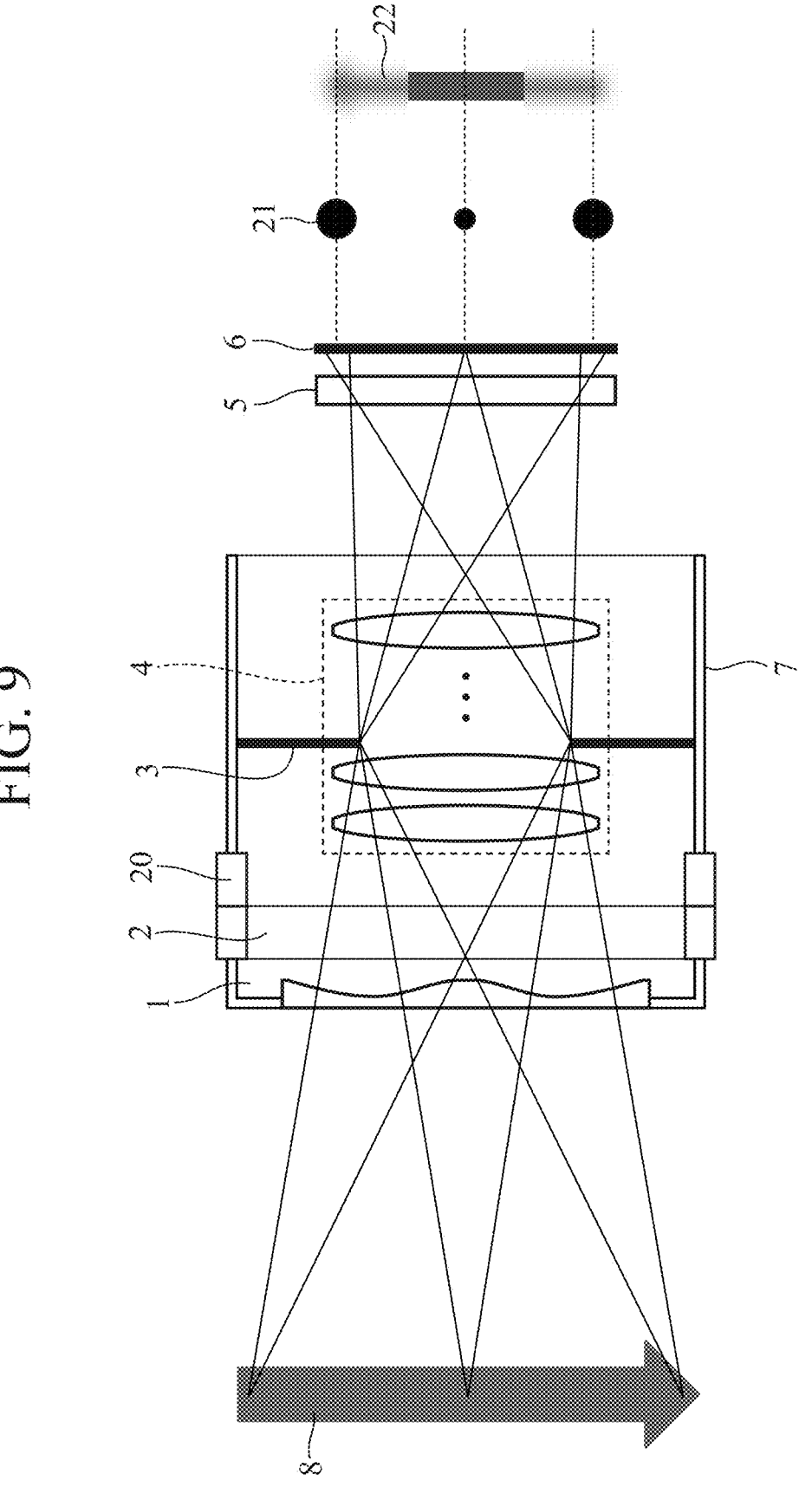
FIG. 9 is an operation explanatory diagram in the infrared optical system according to the fifth embodiment.
Figure 10:
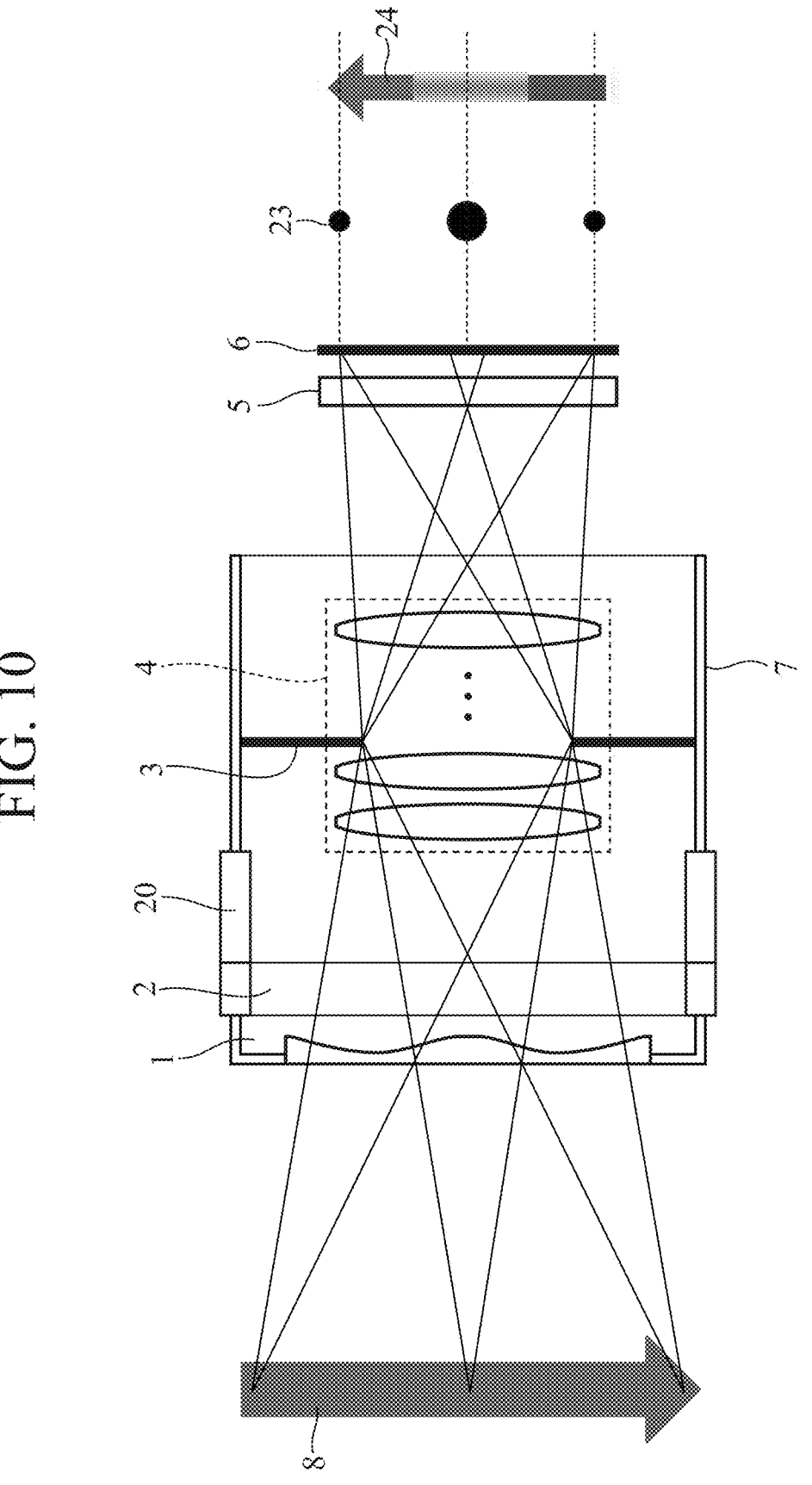
FIG. 10 is an operation explanatory diagram in a case where an interval between an aberration correcting plate unit and a spherical lens unit is widened in the infrared optical system according to the fifth embodiment.

Hereinafter, an infrared optical system according to a fifth embodiment will be described with reference to FIGS. 8 to 10.

Configuration

FIG. 8 illustrates a configuration of the infrared optical system according to the fifth embodiment. The infrared optical system according to the fifth embodiment has a configuration in which an interval adjusting unit 20 is additionally added to the infrared optical system according to the third embodiment. As an example, the interval adjusting unit 20 is disposed between an aberration correcting plate attaching and detaching unit 2 and a lens barrel unit 7, and has a function of adjusting an interval between an aberration correcting plate unit 1 and a spherical lens unit 4. A specific configuration of the interval adjusting unit 20 is achieved by, for example, a screwed structure or a structure to which spacers having different thicknesses can be attached. Note that the interval adjusting unit 20 may be disposed between the aberration correcting plate unit 1 and the aberration correcting plate attaching and detaching unit 2.

The aberration correcting plate unit 1 has a function of giving a phase difference to a light beam passing through the aberration correcting plate unit 1 in such a manner that a region where a resolution is improved on a focal plane unit 6 varies depending on an interval between the aberration correcting plate unit 1 and the spherical lens unit 4.

Operation

An operation of the infrared optical system according to the fifth embodiment in an initial state will be described with reference to FIG. 9. For example, in the initial state illustrated in FIG. 9, among focused spots 21, the size of a spot around the optical axis is reduced by attachment of the aberration correcting plate unit 1, and a resolution around the optical axis is improved in an object image 22.

Next, with reference to FIG. 10, an operation in a case where an interval between the aberration correcting plate unit 1 and the spherical lens unit 4 is changed by the interval adjusting unit 20 will be described. For example, in the state illustrated in FIG. 10, the interval between the aberration correcting plate unit 1 and the spherical lens unit 4 is enlarged by the interval adjusting unit 20. Since a position where each light beam passes through the aberration correcting plate unit 1 changes before and after the interval enlargement, a phase difference given to each light beam also changes. As a result, the size of a focused spot 23 generated by each light beam on the focal plane unit 6 is also changed, and the spot diameter around the optical axis is enlarged, while the spot diameter at a position away from the optical axis is reduced. As a result, a center portion of an object image 24 has a low resolution, and a portion around the center portion has a high resolution.

By the above operation, a resolution of only a region of interest in the object image can be selectively increased. By improving a resolution of a specific region, it is useful, for example, in a case where it is desired to measure a temperature of the specific region with high accuracy (for example, a forehead of a person). In such a case, while a high resolution is required for a specific region, a request for a resolution other than the specific region is low. According to the above operation, since a region having a high resolution can be changed only by adjustment of the interval adjusting unit 20, even in a case where a measurement target changes or moves, a high resolution region can be adjusted while the entire infrared optical system and a structure holding the same remain fixed.

Effects

In the present embodiment, by adjusting an interval between the aberration correcting plate unit 1 and the spherical lens unit 4, a resolution of only a region of interest in an object image can be selectively increased. As a result, a high resolution region can be adjusted while the entire infrared optical system and a structure holding the same remain fixed.

Sixth Embodiment

Hereinafter, an infrared optical system according to a sixth embodiment will be described with reference to FIGS. 11 to 13.

Configuration

Figure 11:
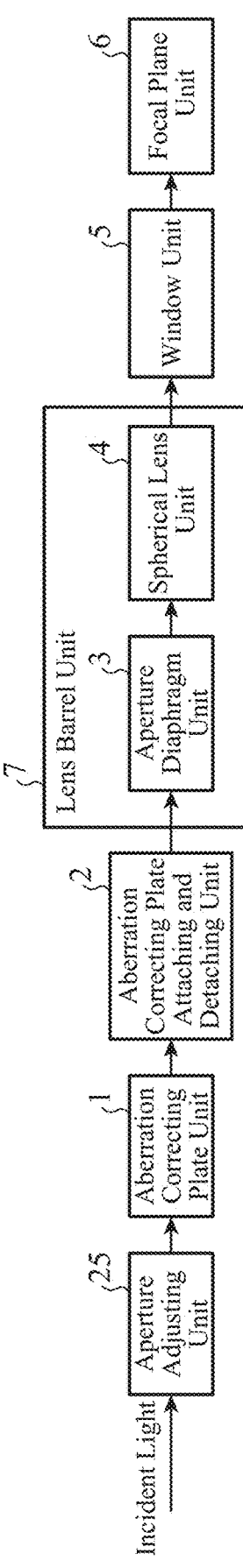
FIG. 11 is a block diagram illustrating an infrared optical system according to a sixth embodiment.

FIG. 11 is a block diagram illustrating the infrared optical system according to the sixth embodiment. The infrared optical system according to the sixth embodiment has a configuration in which an aperture adjusting unit 25 is added to the infrared optical system according to the third embodiment. As an example, the aperture adjusting unit 25 may be disposed at a preceding stage of an aberration correcting plate unit 1 as illustrated in FIG. 11. In this case, the aperture adjusting unit 25 has a function of limiting a light beam incident on the aberration correcting plate unit 1. The aperture adjusting unit 25 is implemented by a variable iris-like structure capable of continuously adjusting an aperture, a structure capable of attaching aperture plates having different diameters, or the like. The aperture adjusting unit 25 may be attachable and detachable to and from an aberration correcting plate attaching and detaching unit 2 or may be formed integrally with the aberration correcting plate attaching and detaching unit 2. Note that the aperture adjusting unit 25 may be disposed at a subsequent stage of the aberration correcting plate unit 1, and in this case, the aperture adjusting unit 25 has a function of limiting a light beam emitted from the aberration correcting plate unit 1.

Operation

Next, with reference to FIG. 12, an operation when a light beam having a view angle is condensed on a focal plane unit 6 in a case where an aperture of the aperture adjusting unit 25 is widened will be described. Note that FIGS. 12 and 13 illustrate a case where a spherical lens unit 4 includes only one spherical lens in order to simplify description.

Examples of a glass material used in an infrared optical system include Si, Ge, and chalcogenide glass, and these glass materials generally have high refractive indexes. In a case where the spherical lens unit 4 is made of such a glass material having a high refractive index, when light beams pass from the inside to the outside of the spherical lens unit 4, a significant increase in refractive angle or total reflection occurs in some of the light beams. In the example of FIG. 12, the above behavior occurs in the first to third light beams from the bottom. For example, in the case illustrated in FIG. 12 in which a light beam having a view angle is condensed using a lens having a convex rear surface, a light beam passing through a lower portion of the spherical lens unit 4 has a larger incident angle with respect to the lens rear surface, and thus the above behavior is more likely to occur. Some of light beams having a significantly large refraction angle or totally-reflected light beams reach the focal plane unit 6, but these reaching positions are separated from reaching positions of the other light beams. Therefore, a false signal is generated in an acquired image, which causes quality deterioration.

In a case where a condensing lens is constituted at low cost, a plano-convex lens, a convex-flat lens, or a both-side convex lens is often used for the spherical lens unit 4. In a case where a plano-convex lens or a convex-flat lens is used, since it is visually easy to distinguish between a front surface and a rear surface of the lens, lens assembly errors can be reduced. In addition, in a case where a both-side convex lens is used, since it is unnecessary to distinguish between a front surface and a rear surface, lens assembly errors can be eliminated. The reduction in assembly errors contributes to reduction in lens cost. As described above, in a case where a condensing lens is constituted at low cost, a convex lens as in the example of FIG. 12 is often used, and total reflection as described above is particularly problematic in a case where an inexpensive condensing lens is used.

Next, with reference to FIG. 13, an operation when a light beam having a view angle is condensed on the focal plane unit 6 in a case where the aperture of the aperture adjusting unit 25 is narrowed will be described. By narrowing the aperture of the aperture adjusting unit 25 as illustrated in FIG. 13, a light beam passing through a lower portion of the spherical lens unit 4 in FIG. 12 can be selectively removed. Meanwhile, a light beam passing through an upper portion of the spherical lens unit 4 and contributing to normal image formation can reach the focal plane unit 6 without being shielded even in a case where the aperture of the aperture adjusting unit 25 is narrowed. Therefore, by narrowing the aperture of aperture adjusting unit 25, stray light can be reduced, and a false signal in an image can be suppressed. Furthermore, even when the aperture of the aperture adjusting unit 25 is narrowed, since a light beam contributing to image formation passes, the amount of light can be maintained.

Figure 12:
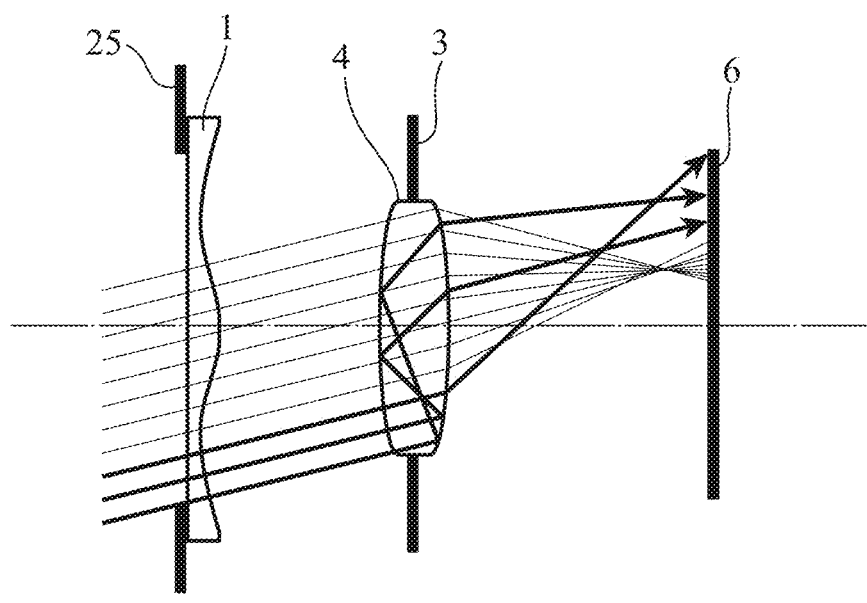
FIG. 12 is an operation explanatory diagram in a case where an aperture of an aberration correcting plate aperture adjusting unit is widened in the infrared optical system according to the sixth embodiment.

A light beam passing through a lower portion of the spherical lens unit 4 in FIG. 12 can be removed also by narrowing the aperture diaphragm unit 3, but in this case, a light beam normally contributing to image formation is also removed. This is because a light beam is disposed in a circle centered on the optical axis on the aperture diaphragm unit 3. Meanwhile, since the aperture adjusting unit 25 is disposed at a preceding stage of the aperture diaphragm unit 3, a light beam in the aperture adjusting unit 25 is disposed in a circle offset from the optical axis. In the example of FIG. 13, a totally-reflected light beam is disposed outside a light beam that is not totally reflected and contributes to image formation, that is, in a region in a direction in which the aperture of the aperture adjusting unit 25 opens. Therefore, by narrowing the aperture adjusting unit 25, only a totally-reflected light beam located outside can be selectively removed.

Figure 13:
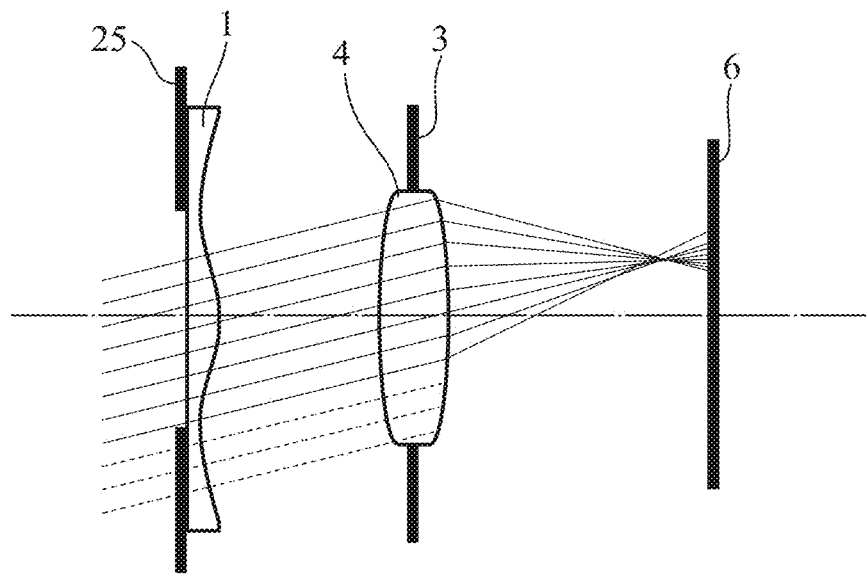
FIG. 13 is an operation explanatory diagram in a case where the aperture of the aberration correcting plate aperture adjusting unit is narrowed in the infrared optical system according to the sixth embodiment.

In FIGS. 12 and 13, since only a light beam corresponding to a single view angle is displayed, it seems that a similar effect to that of the aperture adjusting unit 25 can be achieved by offsetting the aperture diaphragm unit 3 to an upper side. However, in practice, since it is necessary to condense light beams of a plurality of view angles at the same time, in a case where an offset optimized for one view angle is given to the aperture diaphragm unit 3, a light beam contributing to image formation is cut at another view angle, and the amount of light significantly decreases.

Effects

In the present embodiment, by disposing the aperture adjusting unit 25 at a preceding stage of the aberration correcting plate unit 1 or between the aberration correcting plate unit and the spherical lens unit, a light beam totally reflected in the spherical lens unit 4 can be selectively removed, and quality of an image that can be acquired can be improved while the amount of light is maintained.

Supplementary Notes

Some of various aspects of the embodiments described above are summarized below.

Supplementary Note 1

An infrared optical system according to supplementary note 1 includes: a spherical lens unit (4) having an image-forming function as a whole and including one or more spherical lenses that form an image of an incident light beam from a subject; an aperture diaphragm unit (3) that limits transmission of the incident light beam through the spherical lens unit; an aberration correcting plate unit (1; 17) that is disposed at a preceding stage of the spherical lens unit, has at least one aspherical surface, and gives an optical path length difference for compensating an aberration to be generated in the spherical lens unit to the incident light beam; and a lens barrel unit (7) holding the spherical lens unit, the aperture diaphragm unit, and the aberration correcting plate unit.

Supplementary Note 2

An infrared optical system according to supplementary note 2 is the infrared optical system according to supplementary note 1, in which the lens barrel unit includes an aberration correcting plate attaching and detaching unit (2) to and from which the aberration correcting plate unit is attachable and detachable.

Supplementary Note 3

An infrared optical system according to supplementary note 3 is the infrared optical system according to supplementary note 1 or 2, in which the spherical lens unit has a structure maintaining image-forming capability regardless of attachment and detachment of the aberration correcting plate unit.

Supplementary Note 4

An infrared optical system according to supplementary note 4 is the infrared optical system according to any one of supplementary notes 1 to 3, in which the aberration correcting plate unit has a thickness corresponding to a light beam height so as to compensate a spherical aberration to be generated in the spherical lens unit.

Supplementary Note 5

An infrared optical system according to supplementary note 5 is the infrared optical system according to any one of supplementary notes 1 to 4, in which the spherical lens unit has a refractive index of equal to or more than 2.0 and equal to or less than 4.1 at a wavelength of 10 μm, and a total of center thicknesses of the one or more lenses included in the spherical lens unit is equal to or less than 10 mm.

Supplementary Note 6

An infrared optical system according to supplementary note 6 is the infrared optical system according to any one of supplementary notes 1 to 5, in which the aberration correcting plate unit has a refractive index of equal to or more than 1.0 and equal to or less than 2.0 at a wavelength of 10 μm, and the aberration correcting plate unit has a center thickness of equal to or less than 2 mm.

Supplementary Note 7

An infrared optical system according to supplementary note 7 is the infrared optical system according to any one of supplementary notes 1 to 6, in which in a case where power of the spherical lens unit is denoted by $\varphi$, an F value of the spherical lens unit is denoted by F, and a maximum allowable diameter of a spot diameter generated by the spherical lens unit on an image surface is denoted by $\varepsilon$, a parameter $\beta=\varphi'(1-\varphi'L')^{-1}$ expressed by power $\varphi'$ of the aberration correcting plate unit and an interval L' between the aberration correcting plate unit and the spherical lens satisfies a relationship of $|\beta[\varphi(\beta+\varphi)]^{-1}|<\varepsilon F$.

Supplementary Note 8

An infrared optical system according to supplementary note 8 is the infrared optical system according to any one of supplementary notes 1 to 6, in which in a case where power of the spherical lens unit is denoted by $\varphi$, an F value of the spherical lens unit is denoted by F, a maximum allowable diameter of a spot diameter generated by the spherical lens unit on an image surface is denoted by $\varepsilon$, and $\varepsilon$ coincides with a pixel size of a detection element disposed on the image surface, a parameter $\beta=\varphi'(1-\varphi'L')^{-1}$ expressed by power $\varphi'$ of the aberration correcting plate unit and an interval L' between the aberration correcting plate unit and the spherical lens unit satisfies a relationship of $|\beta[\varphi(\beta+\varphi)]^{-1}|<\varepsilon F$.

Supplementary Note 9

An infrared optical system according to supplementary note 9 is the infrared optical system according to any one of supplementary notes 1 to 6, in which in a case where power of the spherical lens unit is denoted by $\varphi$, an F value of the spherical lens unit is denoted by F, a maximum allowable diameter of a spot diameter generated by the spherical lens unit on an image surface is denoted by $\varepsilon$, and $\varepsilon$ coincides with a diffraction limit spot diameter of the spherical lens unit, a parameter $\beta=\varphi'(1-\varphi'L')^{-1}$ expressed by power $\varphi'$ of the aberration correcting plate unit and an interval L' between the aberration correcting plate unit and the spherical lens unit satisfies a relationship of $|\beta[\varphi(\beta+\varphi)]^{-1}|\varepsilon F$.

Supplementary Note 10

An infrared optical system according to supplementary note 10 is the infrared optical system according to any one of supplementary notes 1 to 9, in which the aberration correcting plate unit is an environment compensation aberration correcting plate unit (17) having power so as to be able to compensate a change in image-forming performance of the spherical lens unit due to a change in temperature environment or humidity environment.

Supplementary Note 11

An infrared optical system according to supplementary note 11 is the infrared optical system according to any one of supplementary notes 1 to 10, in which the lens barrel unit includes an interval adjusting unit (20) that can adjust an interval between the aberration correcting plate unit and the spherical lens unit.

Supplementary Note 12

An infrared optical system according to supplementary note 12 is the infrared optical system according to any one of supplementary notes 2 to 11, in which the aberration correcting plate attaching and detaching unit includes an aperture adjusting unit (25) that can narrow a light flux diameter incident on the aberration correcting plate unit or emitted from the aberration correcting plate unit at a preceding stage of the aberration correcting plate unit or between the aberration correcting plate unit and the spherical lens unit.

Supplementary Note 13

An infrared optical system according to supplementary note 13 is an infrared optical system including: a spherical lens unit (4) having an image-forming function as a whole and including one or more spherical lenses that form an image of an incident light beam from a subject; an aperture diaphragm unit (3) that limits transmission of the incident light beam through the spherical lens unit; and a lens barrel unit (7) holding the spherical lens unit and the aperture diaphragm unit, in which the lens barrel unit includes an aberration correcting plate attaching and detaching unit (2) to and from which an aberration correcting plate unit is attachable and detachable in order to dispose the aberration correcting plate unit at a preceding stage of the spherical lens unit.

Supplementary Note 14

An infrared optical system according to supplementary note 14 is the infrared optical system according to supplementary note 13, in which the spherical lens unit has optimized optical characteristics.

Supplementary Note 15

An infrared optical system according to supplementary note 15 is the infrared optical system according to supplementary note 14, in which the optimization is performed for the entire view angle.

Supplementary Note 16

An infrared optical system according to supplementary note 16 is the infrared optical system according to any one of supplementary notes 13 to 15, further including an aberration correcting plate unit (1) attached to the aberration correcting plate attaching and detaching unit, having at least one aspherical surface, and having a thickness optimized depending on a light beam height so as to compensate a spherical aberration to be generated in the spherical lens unit.

Note that the embodiments can be combined, and each of the embodiments can be appropriately modified or omitted.

INDUSTRIAL APPLICABILITY

The infrared optical system of the present disclosure can be used as an infrared camera in various devices or systems such as a home electronic device or a security system.

REFERENCE SIGNS LIST

1: aberration correcting plate unit, 2: aberration correcting plate attaching and detaching unit, 3: aperture diaphragm unit, 4: spherical lens unit, 5: window unit, 6: focal plane unit, 7: lens barrel unit, 8: object, 9: focused spot, 10: object image, 11: focused spot, 12: object image, 13: optical path, 14: optical path, 15: focused spot, 16: object image, 17: environment compensation aberration correcting plate unit, 18: focused spot, 19: object image, 20: interval adjusting unit, 21: focused spot, 22: object image, 23: focused spot, 24: object image, 25: aperture adjusting unit

The invention claimed is:

1. An infrared optical system comprising:
a spherical lens group having an image-forming function as a whole and including one or more spherical lenses to form an image of an incident light beam from a subject;
an aperture diaphragm to limit transmission of the incident light beam through the spherical lens group;
an aberration correcting plate disposed at a stage preceding the spherical lens group, having at least one aspherical surface, and to give an optical path length difference for compensating an aberration to be generated in the spherical lens group to the incident light beam;
an aberration correcting plate attaching and detaching part to and from which the aberration correcting plate is attachable and detachable; and
a lens barrel holding the spherical lens group, the aperture diaphragm, the aberration correcting plate, and the aberration correcting plate attaching and detaching part, wherein
the spherical lens group has a structure maintaining image-forming capability regardless of attachment and detachment of the aberration correcting plate, and
where power of the spherical lens group is denoted by $\varphi$, an F value of the spherical lens group is denoted by F, and a maximum diameter of a spot diameter generated by the spherical lens group on an image surface is denoted by $\varepsilon$, a parameter $\beta = \varphi'(1-\varphi'L')^{-1}$ expressed by power $\varphi'$ of the aberration correcting plate and an interval L' between the aberration correcting plate and the spherical lens group satisfies a relationship of $|\beta[\varphi(\beta+\varphi)]^{-1}| < \varepsilon F$.

2. The optical infrared system according to claim 1, wherein the aberration correcting plate configured to compensate for a spherical aberration generated in a light beam in the spherical lens group before the light beam enters the spherical lens group.

3. The infrared optical system according to claim 2, wherein
the spherical lens group has a refractive index of equal to or more than 2.0 and equal to or less than 4.1 at a wavelength of 10 μm, and
a total of center thicknesses of the one or more lenses included in the spherical lens group is equal to or less than 10 mm.

4. The infrared optical system according to claim 3, wherein
the aberration correcting plate has a refractive index of equal to or more than 1.0 and equal to or less than 2.0 at a wavelength of 10 μm, and
the aberration correcting plate has a center thickness of equal to or less than 2 mm.

5. The infrared optical system according to claim 3, wherein
the aberration correcting plate is an environment compensation aberration correcting plate having power so as to be able to compensate a change in image-forming performance of the spherical lens group due to a change in temperature environment or humidity environment.

6. The infrared optical system according to claim 1, wherein
the lens barrel includes an interval adjuster to be able to adjust an interval between the aberration correcting plate and the spherical lens group.

7. The infrared optical system according to claim 1, wherein
the aberration correcting plate attaching and detaching part includes an aperture adjuster to be able to narrow a light flux diameter incident on the aberration correcting plate or emitted from the aberration correcting plate at a preceding stage of the aberration correcting plate or between the aberration correcting plate and the spherical lens group.

8. An infrared optical system comprising:
a spherical lens group having an image-forming function as a whole and including one or more spherical lenses to form an image of an incident light beam from a subject;
an aperture diaphragm to limit transmission of the incident light beam through the spherical lens group;
an aberration correcting plate disposed at a stage preceding the spherical lens group, having at least one aspherical surface, and to give an optical path length difference for compensating an aberration to be generated in the spherical lens group to the incident light beam;
an aberration correcting plate attaching and detaching part to and from which the aberration correcting plate is attachable and detachable; and
a lens barrel holding the spherical lens group, the aperture diaphragm, the aberration correcting plate, and the aberration correcting plate attaching and detaching part, wherein
the spherical lens group has a structure maintaining image-forming capability regardless of attachment and detachment of the aberration correcting plate, and
where power of the spherical lens group is denoted by $\varphi$, an F value of the spherical lens group is denoted by F, a maximum diameter of a spot diameter generated by the spherical lens group on an image surface is denoted by $\varepsilon$, and $\varepsilon$ coincides with a pixel size of a detection element disposed on the image surface, a parameter $\beta=\varphi'(1-\varphi'L')^{-1}$ expressed by power $\varphi'$ of the aberration correcting plate and an interval L' between the aberration correcting plate and the spherical lens group satisfies a relationship of $|\beta[\varphi(\beta+\varphi)]^{-1}|<\varepsilon F$.

9. The infrared optical system according to claim 8, wherein the aberration correcting plate configured to compensate for a spherical aberration generated in a light beam in the spherical lens group before the light beam enters the spherical lens group.

10. The infrared optical system according to claim 9, wherein the spherical lens group has a refractive index of equal to or more than 2.0 and equal to or less than 4.1 at a wavelength of 10 μm, and a total of center thicknesses of the one or more lenses included in the spherical lens group is equal to or less than 10 mm.

11. The infrared optical system according to claim 10, wherein the aberration correcting plate has a refractive index of equal to or more than 1.0 and equal to or less than 2.0 at a wavelength of 10 μm, and the aberration correcting plate has a center thickness of equal to or less than 2 mm.

12. The infrared optical system according to claim 10, wherein the aberration correcting plate is an environment compensation aberration correcting plate having power so as to be able to compensate a change in image-forming performance of the spherical lens group due to a change in temperature environment or humidity environment.

13. The infrared optical system according to claim 8, wherein the lens barrel includes an interval adjuster to be able to adjust an interval between the aberration correcting plate and the spherical lens group.

14. The infrared optical system according to claim 8, wherein the aberration correcting plate attaching and detaching part includes an aperture adjuster to be able to narrow a light flux diameter incident on the aberration correcting plate or emitted from the aberration correcting plate at a preceding stage of the aberration correcting plate or between the aberration correcting plate and the spherical lens group.

15. An infrared optical system comprising:

a spherical lens group having an image-forming function as a whole and including one or more spherical lenses to form an image of an incident light beam from a subject;

an aperture diaphragm to limit transmission of the incident light beam through the spherical lens group;

an aberration correcting plate disposed at a preceding stage of the spherical lens group, having at least one aspherical surface, and to give an optical path length difference for compensating an aberration to be generated in the spherical lens group to the incident light beam;

an aberration correcting plate attaching and detaching part to and from which the aberration correcting plate is attachable and detachable; and a lens barrel holding the spherical lens group, the aperture diaphragm, the aberration correcting plate, and the aberration correcting plate attaching and detaching part, wherein the spherical lens group has a structure maintaining image-forming capability regardless of attachment and detachment of the aberration correcting plate, and where power of the spherical lens group is denoted by $\varphi$, an F value of the spherical lens group is denoted by F, a maximum diameter of a spot diameter generated by the spherical lens group on an image surface is denoted by $\varepsilon$, and $\varepsilon$ coincides with a diffraction limit spot diameter of the spherical lens group, a parameter $\beta=\varphi'$ $(1-\varphi'L')^{-1}$ expressed by power $\varphi'$ of the aberration correcting plate and an interval L' between the aberration correcting plate and the spherical lens group satisfies a relationship of $|\beta[\varphi(\beta+\varphi)]^{-1}|<\varepsilon F$.

16. The infrared optical system according to claim 15, wherein the aberration correcting plate configured to compensate for a spherical aberration generated in a light beam in the spherical lens group before the light beam enters the spherical lens group.

17. The infrared optical system according to claim 16, wherein the spherical lens group has a refractive index of equal to or more than 2.0 and equal to or less than 4.1 at a wavelength of 10 μm, and a total of center thicknesses of the one or more lenses included in the spherical lens group is equal to or less than 10 mm.

18. The infrared optical system according to claim 17, wherein the aberration correcting plate has a refractive index of equal to or more than 1.0 and equal to or less than 2.0 at a wavelength of 10 μm, and the aberration correcting plate has a center thickness of equal to or less than 2 mm.

19. The infrared optical system according to claim 17, wherein the aberration correcting plate is an environment compensation aberration correcting plate having power so as to be able to compensate a change in image-forming performance of the spherical lens group due to a change in temperature environment or humidity environment.

20. The infrared optical system according to claim 15, wherein the lens barrel includes an interval adjuster to be able to adjust an interval between the aberration correcting plate and the spherical lens group.

\* \* \* \* \*